United States Patent
Jeunesse et al.

(10) Patent No.: US 10,889,246 B2
(45) Date of Patent: Jan. 12, 2021

(54) AUTOMOTIVE INTERIOR EQUIPMENT TRAY AND ASSOCIATED METHOD OF MANUFACTURING

(71) Applicant: FAURECIA AUTOMOTIVE INDUSTRIE, Nanterre (FR)

(72) Inventors: Steve Jeunesse, Mouzon (FR); Gérard Bonnaudet, Touvre (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 64 days.

(21) Appl. No.: 16/204,458

(22) Filed: Nov. 29, 2018

(65) Prior Publication Data

US 2019/0168675 A1   Jun. 6, 2019

(30) Foreign Application Priority Data

Dec. 1, 2017   (FR) ...................................... 17 61532

(51) Int. Cl.
*B60R 5/04*   (2006.01)
*B60R 13/02*   (2006.01)

(52) U.S. Cl.
CPC .............. *B60R 5/044* (2013.01); *B60R 13/02* (2013.01); *B60R 13/0268* (2013.01)

(58) Field of Classification Search
CPC ...... B60R 5/044; B60R 13/02; B60R 13/0268
USPC ................................ 296/37.1, 37.16, 136.03
See application file for complete search history.

(56) References Cited

U.S. PATENT DOCUMENTS

| | | | | |
|---|---|---|---|---|
| 2007/0092690 A1* | 4/2007 | Gocht | ................ | B60R 13/0268 428/100 |
| 2015/0056430 A1* | 2/2015 | Jeunesse | ................... | B32B 3/12 428/213 |
| 2015/0102622 A1* | 4/2015 | Horst | ...................... | B60R 5/044 296/24.43 |
| 2016/0167597 A1* | 6/2016 | Jeunesse | ................. | B32B 38/12 296/39.1 |
| 2017/0291330 A1* | 10/2017 | Jeunesse | .............. | B29D 24/005 |

FOREIGN PATENT DOCUMENTS

| | | |
|---|---|---|
| EP | 2921281 A1 | 9/2015 |
| FR | 2952596 A1 | 5/2011 |
| FR | 2999467 A1 | 6/2014 |
| FR | 3008658 | 1/2015 |

OTHER PUBLICATIONS

English translation of EP 2 921 281; retrieved on Apr. 28, 2020 via PatentTranslate located at www.epo.org. (Year: 2020).*
French Search Report corresponding to application No. FR 1761532, dated Jun. 8, 2018, 2 pages.

* cited by examiner

*Primary Examiner* — Jason S Daniels
(74) *Attorney, Agent, or Firm* — Reising Ethington P.C.

(57) ABSTRACT

An automotive interior equipment tray that defines a top surface, an under surface and a peripheral edge section extending between the under surface and the top surface over a contour of the tray. The peripheral edge section defines with the under surface a peripheral ridge. The tray includes a bead protruding from the under surface in the vicinity of the peripheral ridge.

18 Claims, 4 Drawing Sheets

AUTOMOTIVE INTERIOR EQUIPMENT TRAY AND ASSOCIATED METHOD OF MANUFACTURING

FIELD OF THE INVENTION

The present invention relates to an automotive interior equipment tray for a motor vehicle, that defines a top surface, an under surface, and a peripheral edge section extending between the under surface and the top surface over a contour of the tray, the peripheral edge section defining with the under surface a peripheral ridge.

The tray is intended to constitute a structuring part in a motor vehicle such as a trunk concealing rear shelf, a false passenger compartment floor or false trunk floor, a trunk loading floor, or a sub-engine.

BACKGROUND

A known tray of the aforementioned type comprises of a composite body comprising a sheet of mineral fibers, for example glass fibers, embedded in a polymer matrix.

The cutting of the tray carried out after the molding thereof results in the free ends of the mineral fibers extending beyond the free edges of the tray, thus making the edges sharp. There is therefore a need to improve the functionality of this tray and make it much more user-friendly.

In order to respond to this problem, the patent document FR2999467 describes a part comprising of a sheet constituted of a mixture of polymer fibers and mineral fibers as well as a coating layer formed by a textile material. The coating layer comprises of a central region attached on to the sheet and a peripheral tongue protruding outward freely from the sheet. The tongue plays the role of a lip that happens to fall back over the edges of the sheet when a user tries to grip the part which makes it possible for the user to avoid direct contact with any mineral fibers.

However, this solution, although it is very effective, is not entirely satisfactory. Indeed, the manufacturing process used is sophisticated. In addition, the tool necessary in order to carry out the method tends to wear out quickly.

SUMMARY

An object of the invention is therefore to obtain a motor vehicle tray that offers greater functionality and user-friendliness and that may be manufactured by a simple and inexpensive method.

To this end, the object of the invention relates to a tray of the aforementioned type, wherein the tray comprises a bead protruding from the under surface in the vicinity of the peripheral ridge.

The tray according to various embodiments of the invention may include one or more of the following characteristic features, taken into consideration separately or in accordance with any technically possible combination:
the tray comprises a central plate and a lateral rim protruding from a peripheral edge of the central plate, the peripheral ridge extending over the lateral rim;
the bead is located at a distance greater than 1.5 mm from the peripheral ridge, in particular comprised between 1.5 mm and 6 mm from the peripheral ridge;
the bead extends continuously over the entire contour of the tray;
the maximum thickness of the bead measured from the under surface is greater than 0.2 mm and is advantageously comprised between 0.2 mm and 0.5 mm;
the bead presents a convex transverse cross section, presenting in particular a lower edge that is curved in transverse cross section;
the tray comprises a body comprising of a mixture of a polymeric material and a mineral material;
the tray comprises a spacer and an exterior skin applied on the peripheral edge section at least as far as the peripheral ridge;
the tray in addition comprises an interior skin, the spacer being interposed between the interior skin and the exterior skin;
the exterior skin comprises a polymer matrix and fibers embedded within the matrix;
the peripheral edge section has an upper region and a lower region protruding in a peripheral manner in relation to the upper region, the peripheral ridge being delimited on the lower region;
the matrix is composed of a hot-melt or thermosetting polymer and the fibers are composed of a mineral material, in particular glass fibers;
the maximum thickness of each skin is less than 10% of the maximum thickness of the spacer;
the spacer is composed of a material with a mass per unit area of less than 1500 g/m$^2$, such as cardboard or paper, and has an alveolar structure or a honeycomb structure.

The object of the invention also relates to a manufacturing method for manufacturing a motor vehicle part by means of molding in a mold of at least one body in order to obtain a tray that defines a top surface, an under surface, and a peripheral edge section extending between the under surface and the top surface over a contour of the tray, the peripheral edge section defining with the under surface a peripheral ridge, the method including the formation of a bead in a groove of the mold, the bead protruding from the under surface in the vicinity of the peripheral ridge.

The manufacturing method according to various embodiments of the invention may include one or more of the following characteristic features:
it includes the following steps:
provision of an exterior skin comprising a matrix of hot-melt polymer and fibers embedded within the matrix;
provision of a spacer;
stacking of the exterior skin and the spacer so as to form an assembly; and
heating of the assembly composed of the exterior skin and the spacer to a temperature greater than the melting temperature of the polymer prior to the pressing of the assembly in the mold;
it includes the following steps:
provision of an interior skin comprising of a hot-melt polymer matrix and fibers embedded within the matrix; and
stacking of the exterior skin, the spacer and the interior skin prior to the heating and pressing of the assembly composed of the exterior skin, the spacer and the interior skin in the mold;
it includes the following steps:
provision of a base comprising a mixture of polymeric material and mineral material, in particular a mixture of polymer fibers and mineral fibers; and
heating of the composite base in a heating unit to a temperature greater than the melting temperature of the polymeric material prior to the pressing of the composite base in the mold.

BRIEF DESCRIPTION OF THE DRAWINGS

The invention will be better understood upon reading the description which follows, provided solely by way of example and with reference being to the appended figures, in which.

DETAILED DESCRIPTION

In all the following sections, the orientations are the usual orientations of a motor vehicle. Thus, the terms "upper", "lower", "left", "right", "top" and "bottom/under" are intended to be understood in relation to the normal direction of travel of a motor vehicle and in relation to the position of a driver.

Figure 1:
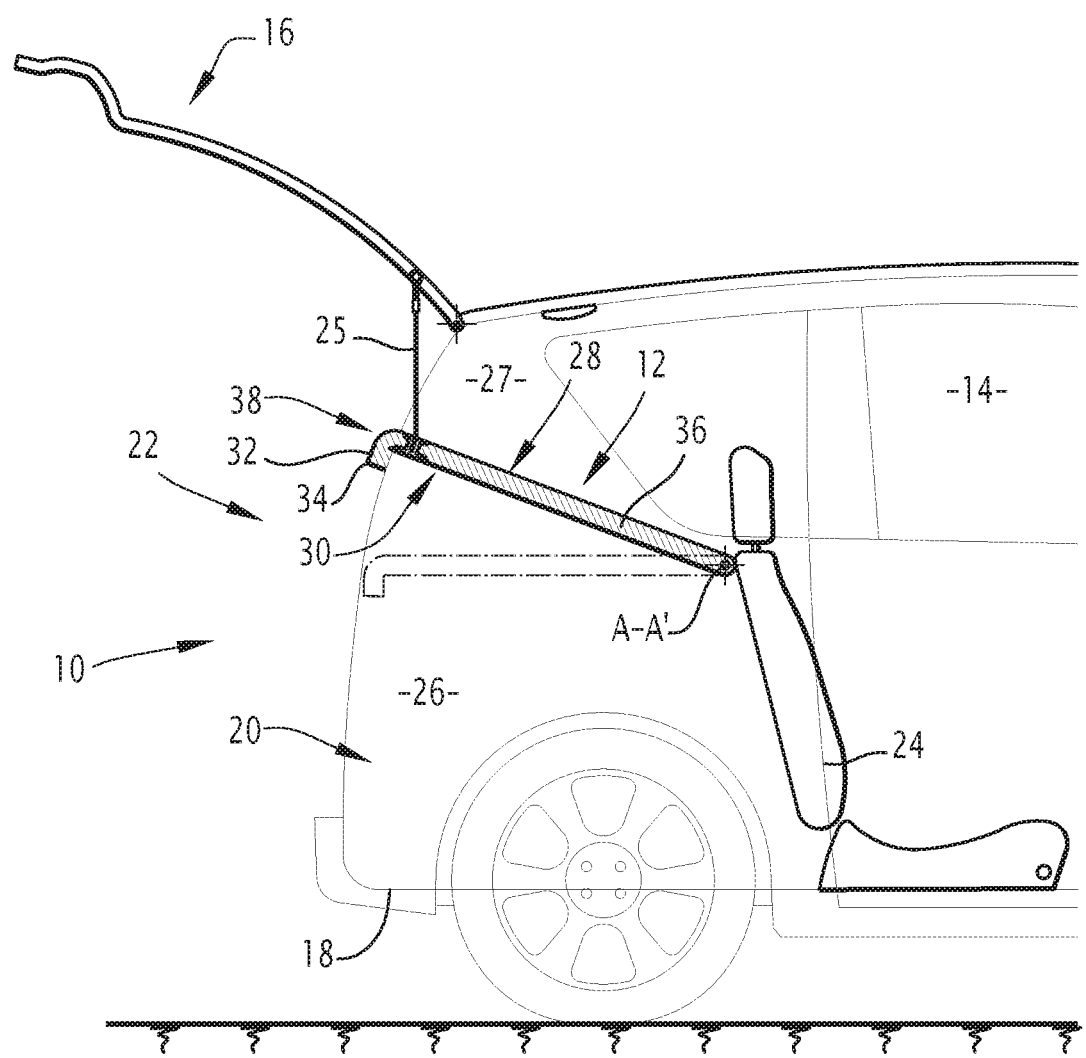
FIG. 1 is a schematic side view of a rear assembly of a motor vehicle comprising of a first tray according to the invention.

FIG. 1 illustrates a rear assembly 10 of a motor vehicle equipped with a first tray 12 according to the invention.

The vehicle defines an interior passenger compartment 14 designed for receiving the driver and the passengers.

The rear assembly 10 comprises a tailgate 16, a floor 18 and lateral trim panels 20.

The rear assembly 10 defines a rear trunk 22 of the motor vehicle. The trunk 22 is a space that is delimited towards the front by the seats 24 of the vehicle, on the sides by the lateral trim panels 20, towards the bottom by the floor 18, towards the top by the ceiling of the vehicle, and towards the rear by the movable tailgate 16.

The tailgate 16 is articulated on the bodywork of the motor vehicle between a closed closing position for closing off the trunk 22 and an open access position for accessing the trunk 22.

The rear assembly 10 of the vehicle advantageously comprises at least one attaching element 25, intended to attach the tray 12 to the tailgate 16 of the vehicle when the tray 12 is mounted in the vehicle. The attaching element 25 is, for example, selected from a cord, a strap, a metal rod or a chain. Preferably, the rear assembly 10 comprises two attaching elements 25 disposed respectively on the left and on the right of the tray 12.

The trunk 22 has a lower part 26 and an upper part 27 delimited there-between by the tray 12.

For example, the volume of the lower part 26 of the trunk 22 is adapted so as to contain a suitcase or heavy objects.

Figure 2:
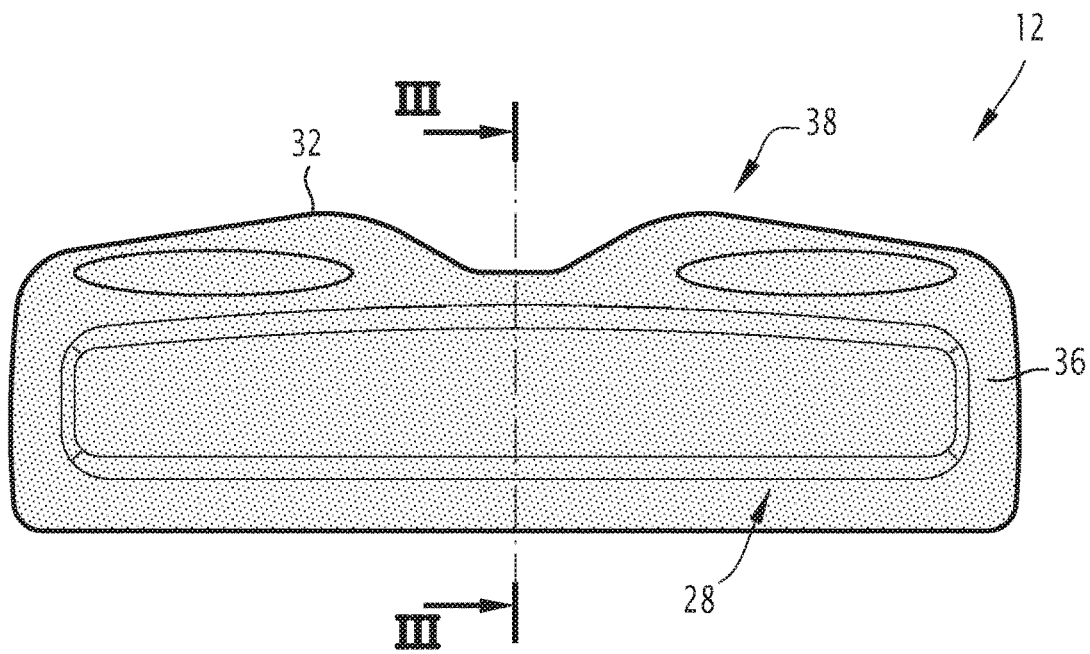
FIG. 2 is a schematic view from the top of a first tray according to the invention.

The tray 12, illustrated in FIG. 2, is intended to close off the lower part 26 of the trunk 22 towards the top.

The thickness of the tray 12 is relatively small as compared to its longitudinal and transverse dimensions. Thus, the tray 12 advantageously has a thickness measuring less than 8 mm, and is, for example, comprised between 3 mm and 7 mm.

The tray 12 is rigid enough to be able to withstand, without macroscopic deformation, objects of non-negligible weight, for example having a weight greater than 1000 g and more generally having a weight comprised between 5 kg and 10 kg depending on the structure of the tray 12.

The tray 12 is mounted so as to be rotatable in the lateral trim panels 20 about a transverse axis A-A' between a rest position represented in broken lines in FIG. 1 and a raised position represented in solid lines in FIG. 1.

In the rest position, the tray 12 is substantially horizontal. In the rest position, the tray 12 is, for example, supported on a rear support of the lateral trim panel 20.

The longitudinal and transverse dimensions of the tray 12 are adapted so as to close off the lower part 26 of the trunk 22 when the tray 12 is in the rest position.

In the raised position, the tray 12 is raised in the upwards direction and inclined relative to the horizontal at an angle greater than 20° in a manner so as to allow access to the lower part 26 of the trunk 22.

The tray 12 is in the rest position when the tailgate 16 is in the closed closure position.

The tray 12 is, for example, maintained in the raised position by the attaching element or attaching elements 25 when the tailgate 16 is in the open position of access.

The tray 12 defines a top surface 28 that is substantially planar and an under surface 30 that is substantially planar and parallel to the top surface 28. The term 'top surface' 28 is used to refer to the surface of the tray 12 which is positioned facing upwards when the tray 12 closes off the lower part 26 of the trunk 22.

The tray 12 in addition defines a peripheral edge section 32 extending between the top surface 28 and the under surface 30 over a contour of the tray 12.

The peripheral edge section 32 defines with the under surface 30, a peripheral ridge 34.

The tray 12 comprises, advantageously, a central plate 36 and a lateral rim 38.

The central plate 36 is substantially horizontal in the rest position of the tray 12.

Figure 3:
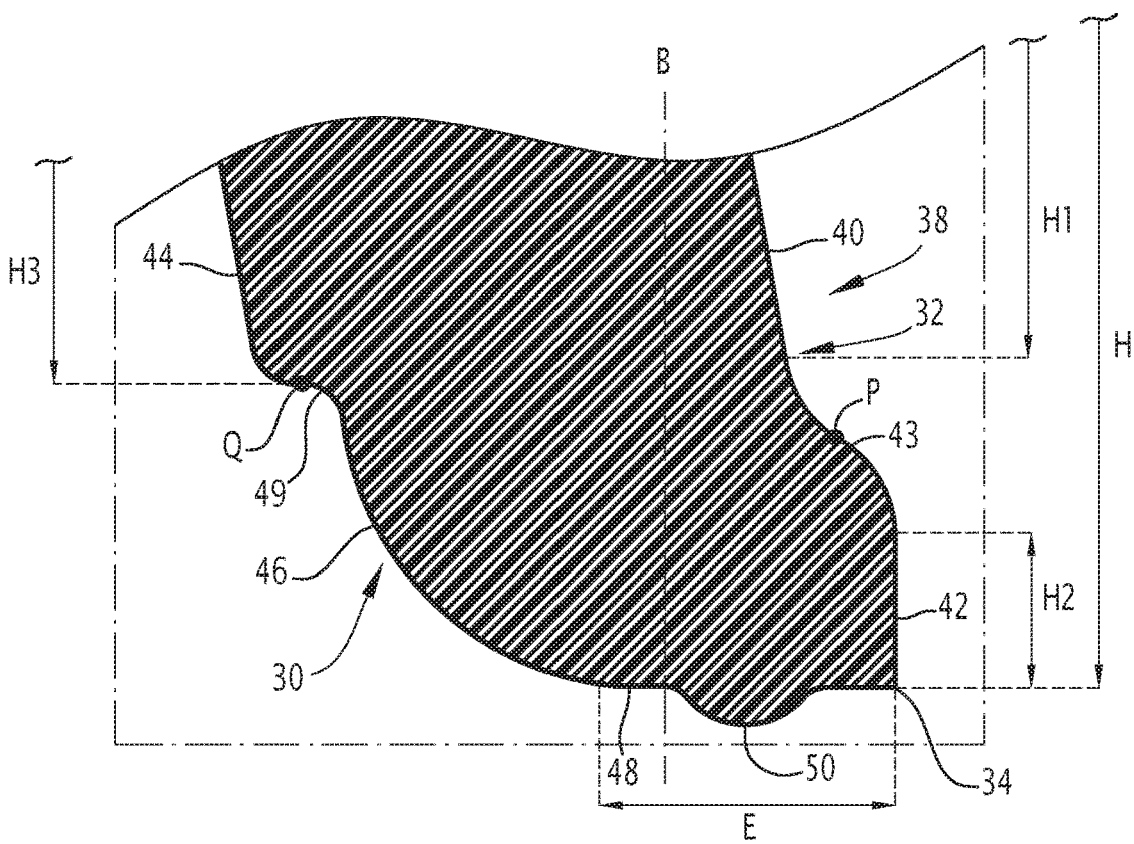
FIG. 3 is a vertical cross-section of a lateral edge of a first tray according to the invention.

The lateral rim 38, illustrated in FIG. 3, is configured so as to be gripped by a user of the motor vehicle in order to remove the tray 12 from the trunk 22 or conversely in order to put the tray 12 back in place in the trunk 22.

The lateral rim 38 protrudes outwards from a peripheral edge of the central plate 36.

Advantageously, the lateral rim 38 extends substantially towards the bottom of the trunk 22 when the tray 12 is in the rest configuration.

The lateral rim 38 advantageously extends, in a transverse vertical plane B, shown in FIG. 3, up to a height H of comprised between 10 mm and 80 mm from the central plate 36.

The peripheral edge section 32 and the peripheral ridge 34 extend over the lateral rim 38.

As represented in FIG. 3, the peripheral edge section 32 has an upper region 40 and a lower region 42.

The lower region 42 protrudes out in a peripheral manner in relation to the upper region 40

The peripheral ridge 34 is formed towards the top by the lower region 42.

The upper region 40 and the lower region 42 are substantially planar.

The upper region 40 advantageously extends, in a transverse cross-sectional plane, up to a height H1 comprised between 5 mm and 75 mm from the central plate 36.

The lower region 42 advantageously extends, in a transverse cross-sectional plane, up to a height H2 comprised between 1 mm and 5 mm from the peripheral ridge 34.

The upper region 40 and the lower region 42 are connected by a first connector 43 comprising at least one inflection point P. Advantageously, the radius of curvature of the first connector 43, on each side of the inflection point P is comprised between 1 mm and 2 mm.

The peripheral ridge 34 here has a substantially straight angle and presents a sharp edged aspect for a user gripping the lateral rim 38.

The under surface 30, at the level of the lateral rim 38, has an upper zone 44, an intermediate zone 46 and a lower zone 48.

The upper zone 44 protrudes outwards in relation to the intermediate zone 46.

The upper zone 44 is substantially planar and inclined relative to the vertical when the tray occupies its horizontal rest configuration.

The upper zone 44 advantageously extends, in a transverse cross-sectional plane, up to a height H3 comprised between 5 mm and 73 mm from the central plate 36.

The intermediate zone 46 presents a convex shaped form, advantageously having a minimum radius of curvature comprised between 3 mm and 6 mm.

The upper zone 44 and the intermediate zone 46 are connected by a second concave connector 49 comprising at least one inflection point Q. Advantageously, the radius of curvature of the second connector 49, on each side of the inflection point Q, is comprised between 0.5 mm and 1.5 mm.

The lower zone 48 is substantially planar. In the rest position of the tray 12, the lower zone 48 is substantially horizontal.

The peripheral ridge 34 is formed towards the bottom by the lower zone 48.

The lower zone 48 advantageously extends, in a transverse cross-sectional plane, over a thickness E comprised between 3 mm and 6 mm from the peripheral ridge. 34.

According to the invention, the tray 12 comprises a bead 50 protruding from the under surface 30, visible in FIG. 3.

Advantageously, the bead 50 protrudes substantially towards the bottom of the trunk 22 when the tray 12 is in the rest configuration.

The bead 50 extends, advantageously, over the lower zone 48 of the lateral rim 38.

The bead 50 is positioned advantageously, at a distance greater than 1.5 mm from the peripheral ridge 34, in particular comprised between 1.5 mm and 6 mm from the peripheral ridge 34.

This distance is measured along the under surface 30 between the very top of the bead 50 and the peripheral ridge 34.

In an advantageous embodiment, the bead 50 extends continuously over the entire contour of the tray 12.

The bead 50 preferably has a convex transverse cross section, having a lower edge curved in transverse cross section.

The maximum thickness of the bead 50 measured from the under surface 30 is greater than 0.2 mm and is advantageously comprised between 0.2 mm and 0.5 mm.

Thus, the user wishing to effect the moving of the tray 12 from the rest configuration to the raised configuration, grips the lateral rim 38 and places their fingers on the bead 50 and not on the sharp edged peripheral ridge 34. The bead 50 thus enhances the comfort of the user during their handling and manipulation of the tray 12.

Figure 4:
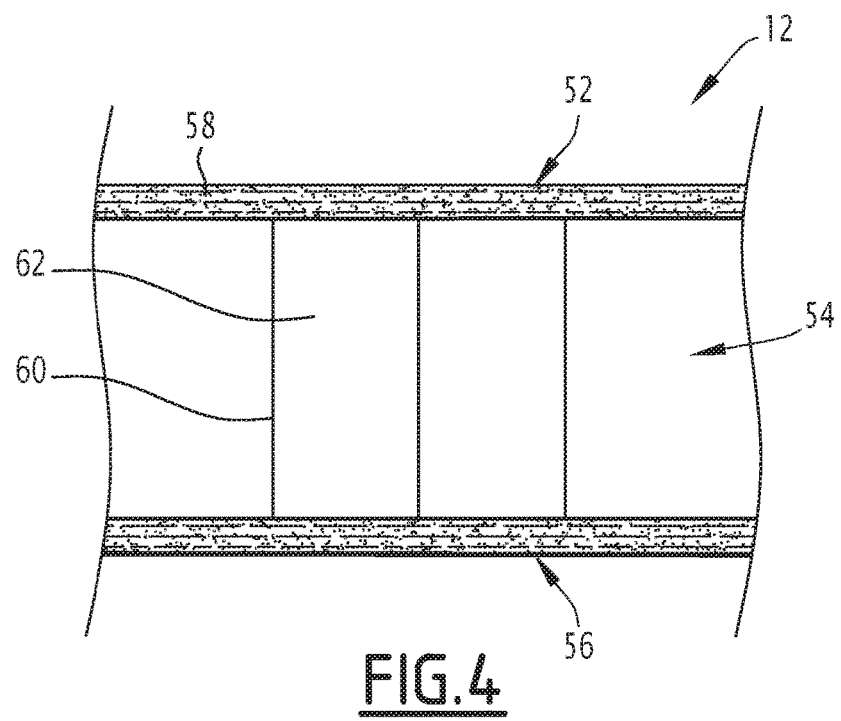
FIG. 4 is a schematic view of a vertical cross-section of a first tray according to the invention.

In the example represented in FIG. 4, the tray 12 comprises at least one exterior skin 52 and a spacer 54.

The exterior skin 52 is applied on the peripheral edge section 32 at least up to the peripheral ridge 34.

Advantageously, the tray 12 comprises, in addition, an interior skin 56. The spacer 54 is interposed between the interior skin 56 and the exterior skin 52. The skin interior is applied to the under surface.

Each skin 52, 56 has a thickness that measures less than that of the spacer 54.

In particular, the maximum thickness of each skin 52, 56 is less than 10% of the maximum thickness of the spacer 54.

The mass per unit area of each skin 52, 56 is greater than 800 kg/m$^3$ and is in particular comprised between 0.7 kg/m$^3$ and 1 kg/m$^3$.

Each skin 52, 56 comprises a polymer matrix and fibers 58 embedded within the matrix.

Advantageously, the matrix is composed of a hot-melt or thermosetting polymer.

The fibers 58 are composed of a mineral material in particular glass fibers 58.

The skin 52, 56 comprises for example between 30 and 50% of glass fibers 58 and between 50 and 70% of polymer.

Each skin 52, 56 is advantageously manufactured by thermoforming from a mat comprising the glass fibers 58 and a layer comprising the thermoplastic polymer.

The mat is preferably formed of long glass fibers 58 (20 to 50 cm long) or continuous glass filaments. These glass fibers 58 or filaments are oriented parallelly to a plane, in particular parallelly to the surfaces of the mat.

The thermoplastic polymer is advantageously polyethylene terephthalate (PET). Indeed, the glass transition temperature of PET is relatively high (of the order of 80° C.), which ensures good creep behavior at high temperature. However, other polymers may be envisaged, such as other polyesters (polybutylene terephthalate (PBT), polylactic acid (PLA), etc.), polyamide or, in the case where the desired structural performance aspects are lower, polyolefins such as polypropylenes or polyethylenes, EVAs (Ethyl Vinyl Acetate), etc or a mixture of different polymers.

Advantageously, the spacer 54 is made based on a honeycomb or alveolar structure. Thus, the spacer 54 has a plurality of walls 60 that are substantially perpendicular to a mean plane of the tray 12, the walls 60 delimiting central spaces of closed contour forming cells 62. Thus, each central space or cell 62 opens up against one of the respective skins 52, 56.

For example, the cells 62 define polygonal meshes, in particular hexagonal meshes.

The maximum transverse dimension of the cells 62, taken parallelly to a mean plane of the tray 12, is greater than 5 mm, and is for example comprised between 5 mm and 20 mm, in particular between 8 mm and 10 mm.

By way of a variant, the cells 62 are corrugated. In this case, the amplitude of the corrugations is comprised between 5 mm and 15 mm and the pitch (distance between two corrugation ridges) is comprised between 5 mm and 20 mm, advantageously 8 mm and 16 mm.

By way of a variant, the spacer is constituted by a rigid foam for example PET. The spacer 54 is advantageously made of a light material, such as paper, or cardboard or a rigid foam.

The mass per unit area of the spacer 54 is low. This mass per unit area is in particular less than 2000 g/m$^2$, and is advantageously comprised between 50 g/m$^2$ and 1500 g/m$^2$. Preferably, this mass per unit area is less than 1500 g/m$^2$ and is substantially between 400 g/m$^2$ and 1200 g/m$^2$.

Thus, the tray 12 presents an appropriate lightness, because of the low mass per unit area of the spacer 54.

The spacer 54 advantageously has a thickness greater than 5 mm, and for example comprised between 5 mm and 20 mm, in particular between 5 mm and 30 mm.

A first manufacturing method for manufacturing according to the invention a first tray 12 will now be described.

Initially, two skins 52, 56 are fabricated, for example, by superposition of a mat comprising of glass fibers 58 and a layer comprising of the thermoplastic polymer.

Each skin 52, 56 is formed by thermoforming.

The two skins 52, 56 and a spacer 54 are then provided in the form of plates cut in the desired format.

The exterior skin 52, the spacer 54 and the interior skin 56 are stacked in order for the spacer 54 to be interposed between the two skins 52, 56.

The method then comprises a heating step, during which this assembly formed by the spacer 54 and the skins 52, 56 is disposed in heating means, in particular a heating unit comprising two heating plates each having an anti-adhesion coating, each heating plate being brought to a temperature at least equal to the melting temperature of the thermoplastic polymer.

In one advantageous embodiment in which the thermoplastic polymer is PET, the hot plates are heated to a temperature of 270° C., that is to say 15° C. above the melting temperature of the PET. After about 1 minute, the time required for complete melting of the polymer, the assembly is introduced into a mold controlled at 140° C. (PET crystallization temperature). At this stage, the skins 52, 56 each have a thickness of the order of 1.5 mm.

Figure 5:
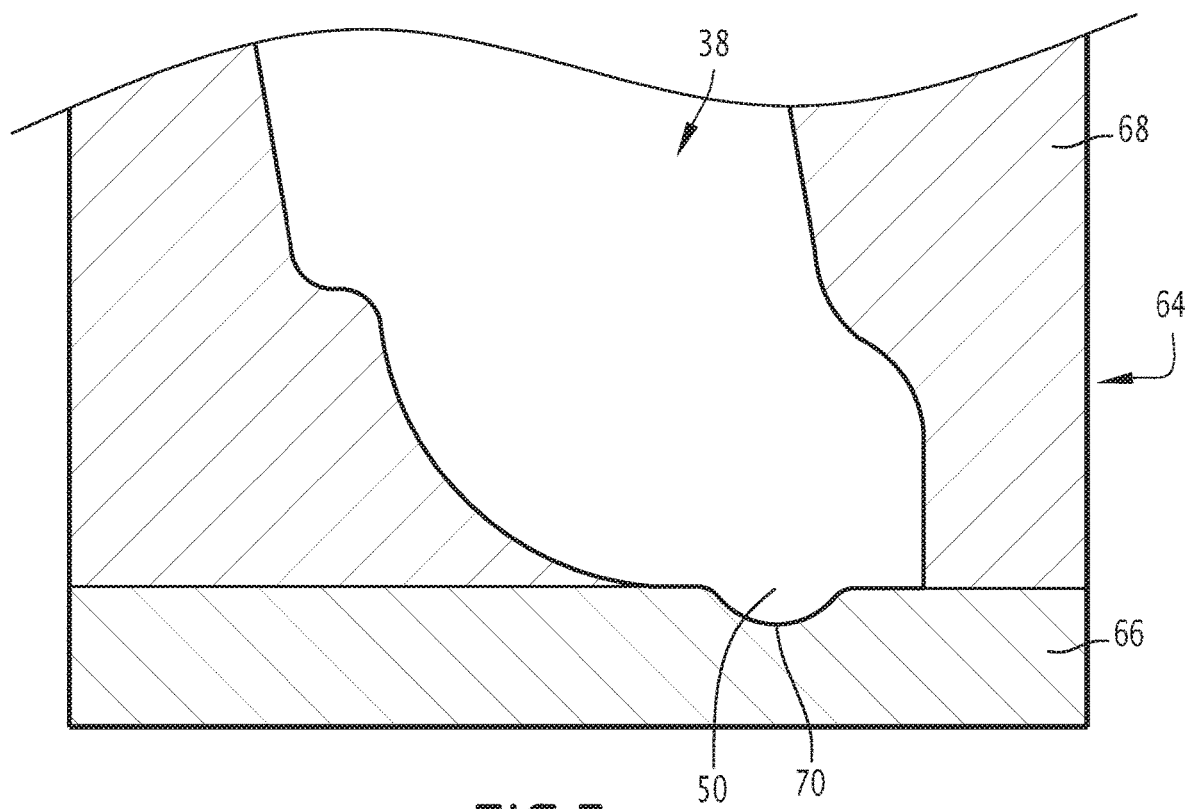
FIG. 5 is a cross-section of a mold during a step of a method of manufacturing a first tray according to the invention.

When the totality of the polymer has melted, the assembly is transferred into a mold 64, represented in FIG. 5, for a pressing step, that enables the forming as such. The mold 64 may be cold (controlled at a temperature of the order of 15° C. for example) or hot (controlled at the crystallization temperature of the polymer).

The mold 64 comprises, advantageously, two half-molds 66 and 68 that are adapted in order to cooperate with one another so as to form the tray 12.

The mold 44 further comprises at least one groove 70 that enables the formation of a bead 50 on the tray 12 The bead 50 thus formed is of a complementary shape to the groove 70.

Advantageously, the bead 50 is formed on the interior skin 56.

The two half-molds 66, 68 of the mold 64 are closed again, slightly compressing the skins 52, 56 in formation until the required thickness is obtained which makes it possible for the polymer which is still at a temperature above its melting temperature to finish flowing in a homogeneous manner.

Each skin 52, 56 thus, under the effect of a low pressure, is able to conform to the internal relief of the mold 64 and in particular, to form the bead 50 on the under surface 30 of the tray 12.

The mold 64 is configured in a manner such that the skins 52, 56 arranged on either side of the spacer 54 have a final thickness that is substantially equal to 1 mm.

The press associated with the mold 64 is a low power press capable of exerting a force of only 20 tons.

In the advantageous embodiment in which the thermoplastic polymer is PET, after 1 minute, the time required for sufficient crystallization of the PET, the mold 64 is opened and the tray 12 is extracted.

By way of a variant, the step of heating is carried out before the step of stacking of the two skins 52, 54 and the spacer 54.

Each skin 52, 56 is heated separately.

The exterior skin 52, the spacer 54 and the interior skin 56 are then stacked in order for the spacer 54 to be interposed between the two skins 52, 56.

By way of a variant, another polymer may be selected in place of the PET, such as polypropylene. In this case the heating can take place after the stacking of the different layers has been carried out. Indeed, the desired temperature in this case is of the order of 200° C. which preserves the cardboard spacer.

In this case the mold may be a cold mold, that is to say, regulated between 16° C. and 22° C., since crystallization is not desired.

A second tray 112 according to the invention will now be described.

Figure 6:
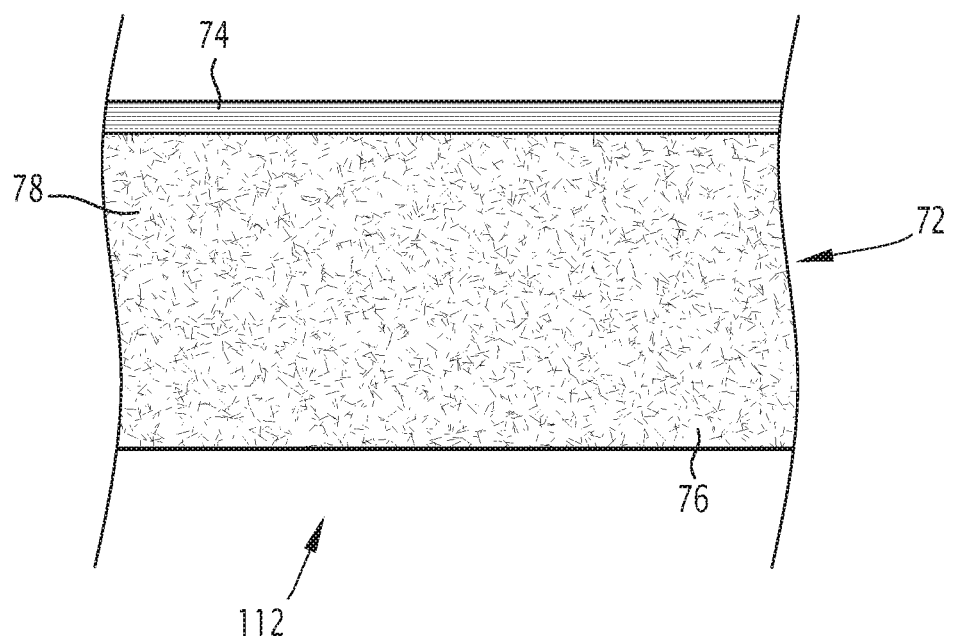
FIG. 6 is a schematic view of a vertical cross-section of a second tray according to the invention.

The second tray 112, illustrated in FIG. 6, differs from the first tray 12 in that it comprises a central body 72 made from a composite material and, advantageously, a covering layer 74 attached on to the central body 72.

The central body 72 comprises a mixture of a polymeric material and a mineral material, in particular a mixture of polymer fibers and mineral fibers. This material is for example referred to by the term "Sommold" when the polymer is polypropylene.

The central body 72 comprises a polymer matrix 76 and fibers made of a mineral material 78 dispersed in the matrix 76.

The matrix 76 is, for example, formed from a thermoplastic polymer, in particular an olefin thermoplastic polymer, such as polyethylene or polypropylene, or an unsaturated polyester polymer.

The mineral fibers 78 are advantageously glass fibers.

The covering layer 74 is for example formed by a textile material, such as a fabric, a knitted fabric (for example a Jersey) or a nonwoven fabric (for example a needle punch).

The covering layer 74 has a maximum thickness that is less than the maximum thickness of the central body 72.

The covering layer 74 advantageously extends along the top surface 28 and the peripheral edge section 32 of the tray 112.

A second method of manufacturing according to the invention for a second tray 112 will now be described.

Initially, a composite base is provided.

The composite base comprises a mixture of polymer material and mineral material, in particular a mixture of polymer fibers and mineral fibers 78.

The composite base is then heated in a heating unit to a temperature that is higher than the polymer melting temperature, in order to induce fusion of the polymer fibers and form the central body 72 of the tray 12.

The covering layer 74 is applied on to the composite base so as to form an assembly.

The assembly is transferred into the mold 64, represented in FIG. 5, in order to form the tray 112.

In particular, the bead 50 is formed in a manner similar to the first method.

The invention claimed is:

1. An automotive interior equipment tray for a motor vehicle, wherein the tray defines a top surface, an under surface, and a peripheral edge section extending between the under surface and the top surface over a contour of the tray, the peripheral edge section defining with the under surface a peripheral ridge;

wherein the tray comprises a bead protruding from the under surface in the vicinity of the peripheral ridge, and wherein the bead is formed in a groove of a mold.

2. The tray according to claim 1, wherein the tray comprises a central plate and a lateral rim protruding from a peripheral edge cross-section of the central plate, the peripheral ridge extending on the lateral rim.

3. The tray according to claim 1, wherein the bead is located at a distance greater than 1.5 mm from the peripheral ridge.

4. The tray according to claim 3, wherein the bead is located at a distance comprised between 1.5 mm and 6 mm from the peripheral ridge.

5. The tray according to claim 3, wherein the bead extends continuously over the entire contour of the tray.

6. The tray according to claim 1, wherein a maximum thickness of the bead measured from the under surface is greater than 0.2 mm.

7. The tray according to claim 1, wherein the bead presents a convex transverse cross section.

8. The tray according to claim 7, wherein the bead presents a lower edge that is curved in transverse cross section.

9. The tray according to claim 1, comprising a body comprising a mixture of a polymeric material and a mineral material.

10. The tray according to claim 1, comprising a spacer and an exterior skin applied on the peripheral edge section at least as far as the peripheral ridge.

11. The tray according to claim 10, in addition comprising an interior skin, the spacer being interposed between the interior skin and the exterior skin.

12. The tray according to claim 10, wherein the exterior skin comprises a polymer matrix and fibers embedded within the matrix.

13. The tray according to claim 1 wherein the peripheral edge section has an upper region and a lower region protruding in a peripheral manner from the upper region, the peripheral ridge being delimited on the lower region.

14. A manufacturing method for manufacturing a motor vehicle part, comprising molding in a mold at least one body into a tray that defines a top surface, an under surface and a peripheral edge section extending between the under surface and the top surface over a contour of the tray, the peripheral edge section defining with the under surface a peripheral ridge, wherein the method includes the formation of a bead in a groove of the mold, the bead protruding from the under surface in the vicinity of the peripheral ridge.

15. The manufacturing method according to claim 14, including the following additional steps:
providing an exterior skin comprising a matrix of hot-melt polymer and fibers embedded within the matrix;
providing a spacer;
stacking the exterior skin and the spacer so as to form an assembly; and
heating the assembly composed of the exterior skin and the spacer to a temperature greater than the melting temperature of the polymer prior to the pressing of the assembly in the mold.

16. The manufacturing method according to claim 15, including the following additional steps:
providing an interior skin comprising of a hot-melt polymer matrix and fibers embedded within the matrix; and
stacking the exterior skin, the spacer and the interior skin prior to the heating and pressing of the assembly composed of the exterior skin, the spacer and the interior skin in the mold.

17. The manufacturing method according to claim 16, including the following additional steps:
providing a base comprising a mixture of polymeric material and mineral material; and
heating the composite base in a heating unit to a temperature greater than the melting temperature of the polymeric material prior to the pressing of the composite base in the mold.

18. The manufacturing method according to claim 16, wherein the base comprises a mixture of polymer fibers and mineral fibers.

* * * * *